United States Patent [19]

Aharon

[11] Patent Number: 4,967,053
[45] Date of Patent: Oct. 30, 1990

[54] LASER SYSTEM

[75] Inventor: Roni Aharon, Ra'anana, Israel

[73] Assignee: F.I.A. Futurologie Industrielle Automation GmbH, Frankfurt am Main, Fed. Rep. of Germany

[21] Appl. No.: 346,620

[22] Filed: May 2, 1989

[51] Int. Cl.⁵ .............................................. B23K 26/00
[52] U.S. Cl. ........................ 219/121.78; 219/121.79; 219/121.74; 219/121.63
[58] Field of Search ................. 219/121.63, 121.64, 219/121.74, 121.78, 121.79

[56] References Cited

U.S. PATENT DOCUMENTS

| | | | |
|---|---|---|---|
| 3,913,582 | 10/1985 | Sharon | 128/303 R |
| 3,986,767 | 10/1976 | Rexer et al. | 350/299 |
| 4,088,865 | 5/1978 | Peters et al. | 219/121.79 X |
| 4,125,755 | 11/1978 | Plamquist | 219/121.6 |
| 4,317,021 | 2/1982 | Walch et al. | 219/121.67 |
| 4,431,899 | 2/1984 | Racki et al. | 219/121.67 |
| 4,550,241 | 10/1985 | Scott et al. | 219/121.67 |
| 4,618,758 | 10/1986 | Gilli et al. | 219/121.67 |
| 4,626,999 | 12/1986 | Bannister | 219/121.67 X |
| 4,638,143 | 1/1987 | Akeel | 219/121.74 |
| 4,650,952 | 3/1987 | Akeel | 219/121.74 |
| 4,661,681 | 4/1987 | Bannister | 219/121.78 |
| 4,677,274 | 6/1987 | Bisiach | 219/121.78 |
| 4,694,139 | 9/1987 | Roder | 219/121.79 |
| 4,695,701 | 9/1987 | Monteith et al. | 219/121.79 |
| 4,698,483 | 10/1987 | Marinoni et al. | 219/121.78 |
| 4,701,591 | 10/1987 | Masaki et al. | 219/121.79 X |
| 4,728,771 | 3/1988 | Sartorio | 219/121.78 X |
| 4,794,222 | 12/1988 | Funayama et al. | 219/121.79 X |

FOREIGN PATENT DOCUMENTS

| | | | |
|---|---|---|---|
| 2592824 | 7/1987 | France | 219/121.64 |
| 0021491 | 2/1984 | Japan | 219/121.74 |
| 2134071 | 8/1984 | United Kingdom . | |

Primary Examiner—C. L. Albritton
Attorney, Agent, or Firm—Cushman, Darby & Cushman

[57] ABSTRACT

A laser system including beam locating assemblies which bring the beam to two separate welding or cutting locations. A beam director apparatus is provided for receiving and directing the laser beam selectably along a fixed generally horizontal first axis in one of the two directions and a mirror is located for redirecting the beam along a second axis to a welding or cutting head.

18 Claims, 14 Drawing Sheets

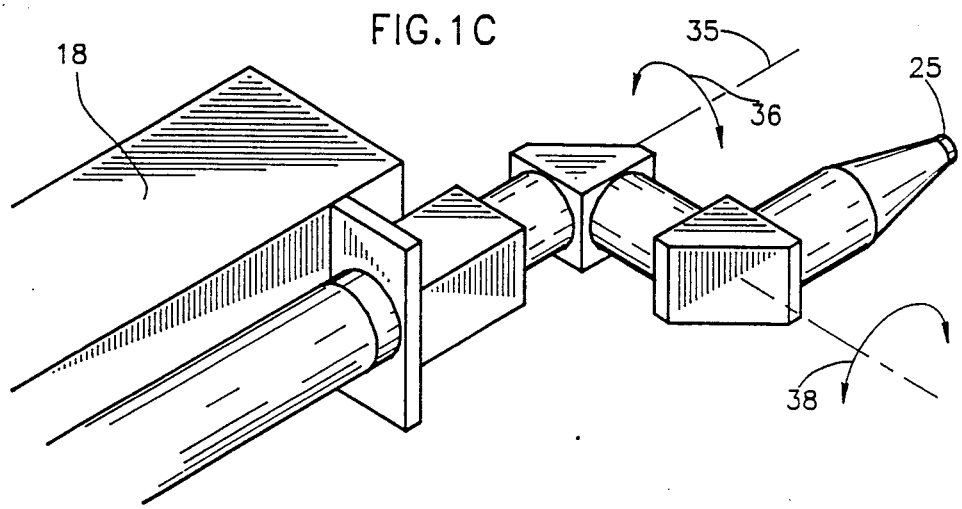
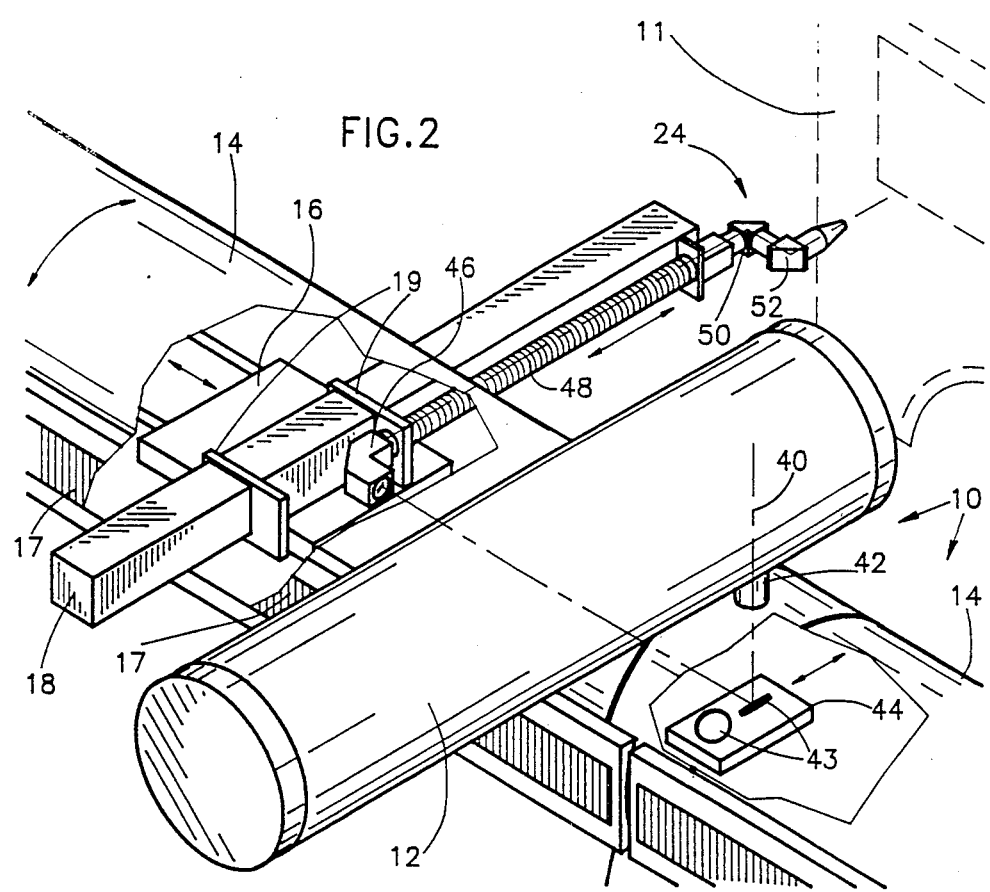

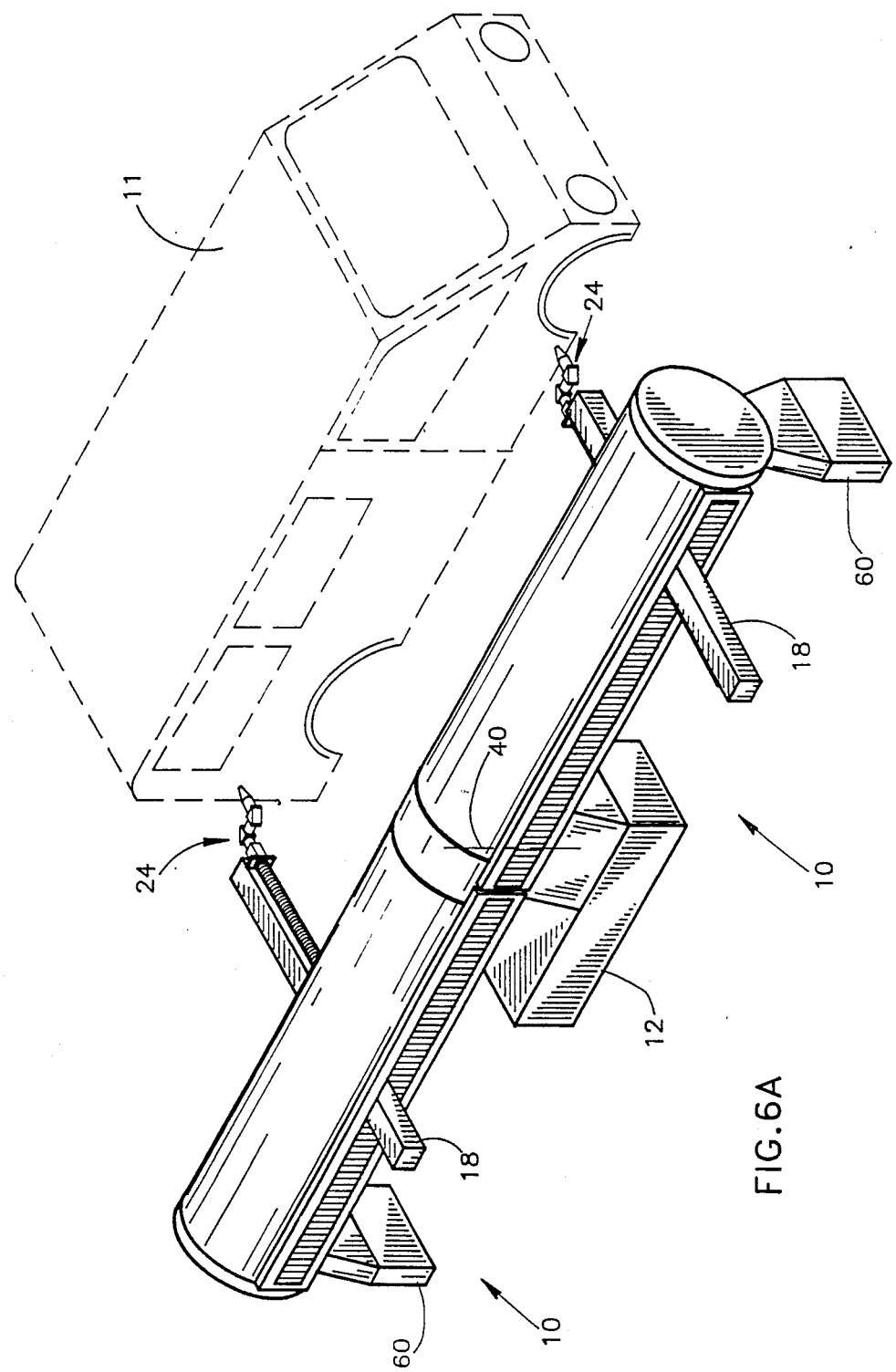

LASER SYSTEM

FIELD OF THE INVENTION

The present invention relates to laser systems generally and to robotic laser systems in particular.

BACKGROUND OF THE INVENTION

Various robotic laser systems have been developed and have been utilized in various applications, such as in automotive production systems. These robotic laser systems typically combine a laser system with an existent or an improved robot system, thus reducing development costs.

UK Patent No. 2,134,071 describes a rotating and translating optical joint comprising a mirror for directing a collimated laser beam through a robot. An apparatus for moving the joint is also disclosed, as is a robot built from a plurality of such joints.

A combination of two of the joints described in UK Patent No. 2,134,071 which rotate with respect to each other is known as a rotary elbow and is typically placed at every rotary joint of the robot. It is known in the art that the two mirrors of such a rotary elbow must be maintained very accurately parallel in three dimensions. Any misalignment has a potential for causing large deviations of the laser beam. If a misaligned rotary elbow is located roughly 2.5 meters from the end of the optical path, a laser beam impinging upon it will be deflected by as much as a few millimeters. This deflection reduces the accuracy with which the laser beam can be aimed.

There is known a COBRA robotic laser which is built by Ferranti Laser Systems of the UK and which comprises a Ferranti Laser System laser system and an ASEA articular robot. The laser beam of the Cobra is split before entering the robot and the two resultant beams are directed along the two sides of the ASEA robot. Two rotary elbows, one on each side of the robot, are placed at each of the six joints and thus, the system comprises 24 mirrors, the entirety of which must be accurately aligned in three dimensions in order to avoid unacceptable divergence of the laser beam.

U.S. Pat. No. 4,698,483 discloses another robotic laser system, a combination of the "SMART" Robot by Comau of Italy with a laser system. This five degree of freedom system utilizes nine mirrors to bring the laser beam to the cutting location. Although the number of mirrors utilized is reduced over the prior art, inaccuracies as described above, resulting from the difficulties involved in aligning nine mirrors, remain.

Yet another robotic laser system, the L-100 manufactured by General Motors Fanuc (GMF) of the U.S., is known in the art. Similar to the other companies described hereinabove, GMF incorporates a laser system into an existing robot, however, the robot chosen has simple mechanics and requires only four mirrors. The robotic system is designed such that the laser beam enters the robot vertically from above and impinges upon a rotary elbow early in the optical path. If it is desired to combine two robots, it is known in the art to add a beam director, which typically comprises two mirrors each pointing towards one of the two robots and which directs the beam horizontally, and one mirror per robot to direct the beam to enter the robot vertically.

The reduced number of mirrors on the L-100 enhances its ability to produce a laser beam with little divergence and with fairly small deviations; however, the existing robot is not designed for the accuracies required by the optical path. The robot has production tolerances on its mechanical parts that, as they accumulate, become too high to ensure an accurate optical path. Moreover, the rotary elbow at the beginning of the optical path can cause divergence of the laser beam.

SUMMARY OF THE INVENTION

There is provided in accordance with a preferred embodiment of the present invention a laser system comprising laser apparatus which provides a laser beam along a fixed first axis, apparatus for redirecting the laser beam to impinge on a workpiece at a desired location thereon and including apparatus disposed for rotation and translation about the fixed first axis which redirects the laser beam along a second axis and a laser head apparatus arranged to receive the laser beam along the second axis and to cause it to impinge on the workpiece at the desired location.

Additionally, according to a preferred embodiment of the invention, the apparatus disposed for rotation and translation comprises a single flat mirror.

Further, according to a preferred embodiment of the invention, the laser apparatus comprises apparatus for receiving the laser beam along a third axis and for redirecting it along the fixed first axis. The apparatus for receiving the laser beam comprises a beam director which directs the laser beam in a selectable one of two directions.

Additionally, according to a preferred embodiment of the invention, the laser head apparatus comprises a cutting head including two flat mirrors and a concentrating lens. Alternatively, the laser head apparatus comprises a welding head including a flat mirror and a concentrating mirror. The laser head apparatus rotates about two generally orthogonal axes.

Further, in accordance with a preferred embodiment of the present invention, the optical path length of the laser beam along the fixed first axis can greatly exceed the path length from the fixed first axis to the desired location. In addition, the optical path length from the laser apparatus to the laser head apparatus is considerably longer than the optical path length from the laser head means to the desired location.

There is provided according to a preferred embodiment of the invention, a laser system in which the apparatus disposed for rotation and translation comprises an x axis carriage, a y axis arm and a z axis rotation unit. According to a preferred embodiment of the invention and in order to provide a relatively rigid structure, the x axis carriage and the y axis arm each translate on a fixed linear screw. The z axis rotation unit comprises a linear screw displaced from a center of the z axis rotation thereby producing rotation. The linear motion additionally provides the system of the present invention with the ability to work on three of the four sides of a vehicle chassis; conventional articulated robots can typically only work on one side of a vehicle chassis.

Additionally, in accordance with a preferred embodiment of the invention, the apparatus for redirecting comprises a first and a second separate apparatus for redirecting and wherein the laser apparatus comprises a single laser. Each separate apparatus for redirecting comprises three mirrors and the laser apparatus comprises one beam director.

In accordance with an alternative embodiment of the invention, the apparatus for redirecting comprises first, second, third and fourth separate apparati for redirecting and the laser apparatus comprises a single laser. In this alternative embodiment, the first and second separate means for redirecting are located above the third and fourth means for redirecting. Each separate apparatus for redirecting comprises three mirrors and the laser apparatus comprises three beam directors.

It is, additionally, a feature of the present invention that a minimal number of mirrors need be calibrated. For each separate apparatus for redirecting, the mirrors of the laser head apparatus are calibrated with respect to each other. The remaining mirror, the mirror of the apparatus for redirecting, is the only mirror inside the laser system which needs calibration. If the laser system includes a beam director, the mirrors of the beam director are calibrated before calibration of the mirror of the apparatus for redirecting.

In summary, the present invention provides a laser robotic system which has a short external beam delivery path, a mirror which transfers laser beam energy for three degrees of freedom, and a rotary elbow located at the end of the optical path. The requirement of an accurate optical path necessitates a relatively rigid structure and to this end, the three main axes are driven by ball screws.

BRIEF DESCRIPTION OF THE DRAWINGS

The present invention will be understood and appreciated more fully from the following detailed description taken in conjunction with the drawings in which:

FIG. 1C is an enlarged illustration of a welding head useful in the system of FIG. 1A;

FIG. 2 is a pictorial illustration of the generally straight optical path of the laser beam of the system of FIG. 1;

FIGS. 6A-6C are pictorial illustrations of possible configurations of the system of FIG. 1A;

DETAILED DESCRIPTION OF A PREFERRED EMBODIMENT

Figure 1A:
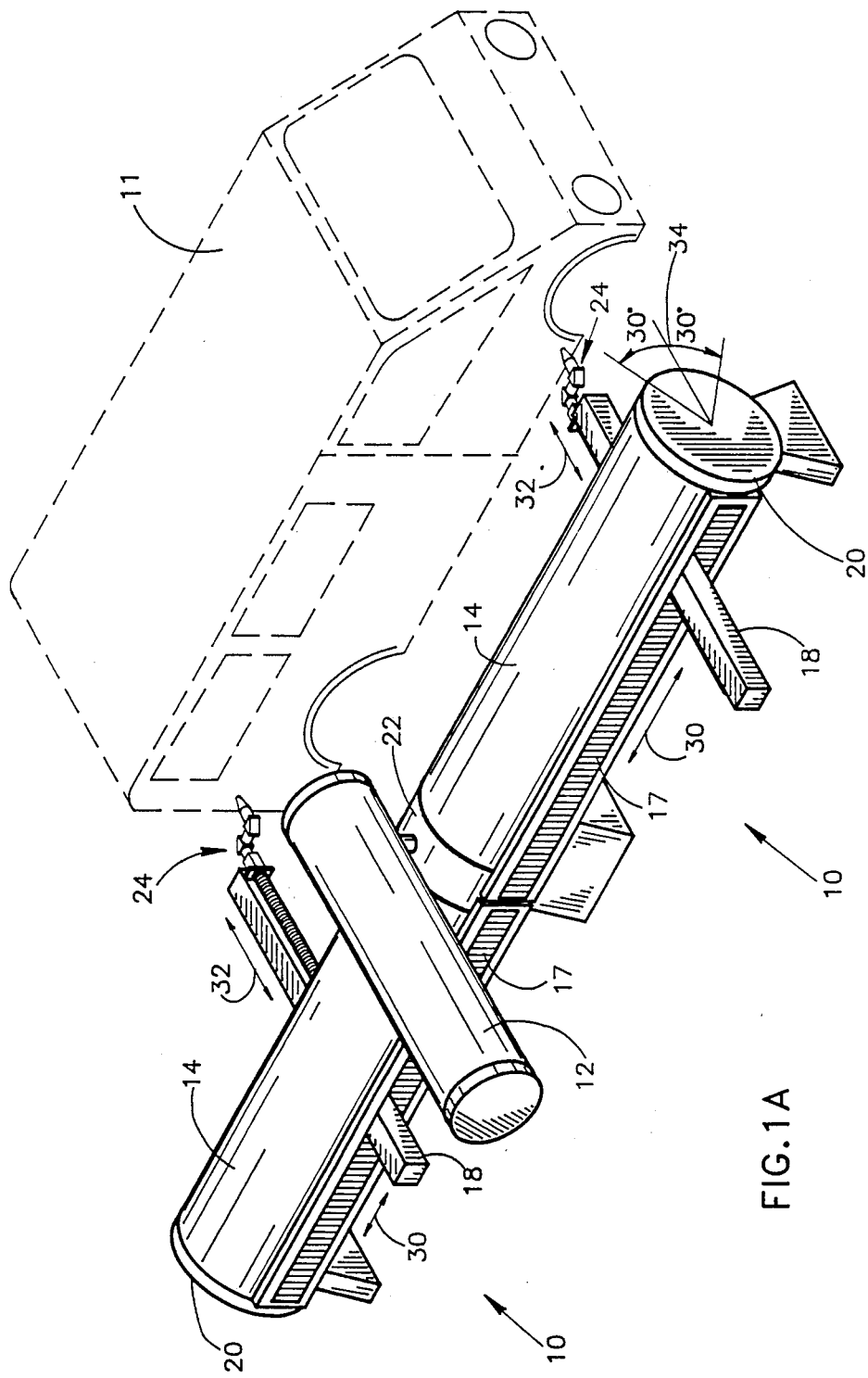
FIG. 1A is an overall system drawing illustrating the laser welding system constructed and operative according to the preferred embodiment of the present invention.
Figure 1B:
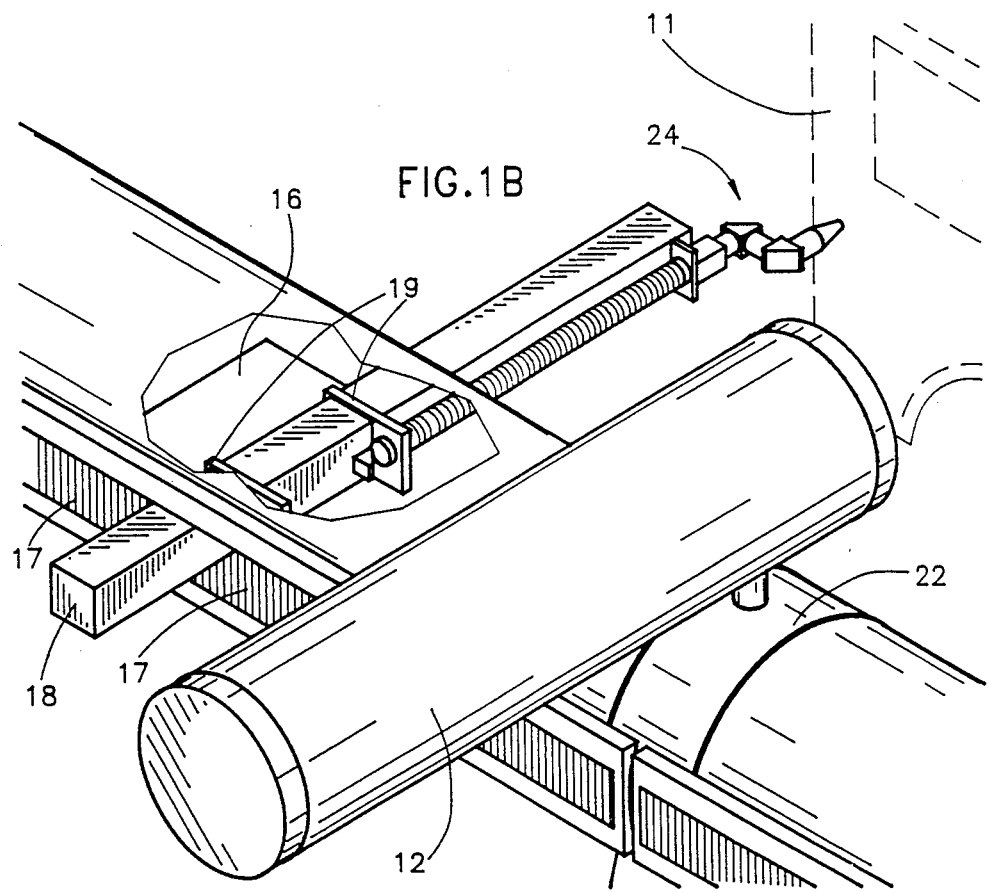
FIG. 1B is an enlarged illustration showing an x axis carriage useful in the system of FIG. 1A.

Reference is now made to FIGS. 1A-1C which illustrate a laser cutting or welding system 10 constructed and operative according to the preferred embodiment of the present invention and operating on a workpiece, typically a vehicle chassis 11. The following discussion will describe the laser welding system, it being understood that the system is generally utilizable in both applications.

The laser welding system 10 as shown in FIG. 1A comprises a laser head 12, such as the MFKP by Ferranti Laser Systems, which produces a laser beam, and two beam locating assemblies 14 which bring the beam to two separate welding locations. Each beam locating assembly 14, in turn, comprises an x axis carriage 16 (FIG. 1B), a y axis arm 18 attached to the x axis carriage via a y axis frame 19 (FIG. 1B), a z axis bearing unit 20 and a middle bearing unit 22 located at the joining location of the two beam assemblies 14, and a welding head 24 for delivering the laser beam to the welding location. The middle bearing unit 22 typically comprises the elements of two z axis bearing units 20. On the welding head 24 preferably is a proximity sensor 25 (FIG. 1C) to ensure that the head 24 comes within a predetermined distance, typically 1-3 mm, of chassis 11.

A bellows unit 17, attached to two sides of the y axis frame 19, ensures that the assembly 14 is completely enclosed. The bellows 17 typically ensure that dust, other particles, or human hands cannot enter the assembly 14 during its operation and thus, ensures the safety and cleanliness of the system 10.

The directing of the laser beam by one of the beam locating assemblies 14 is achieved through movement of units 16-24 as follows. The x axis carriage 16 translates the y axis arm 18 and the head 24 along a fixed x axis; the motion is marked by arrow 30. The beam locating assembly 14 rotates about the fixed x axis, within a range of ±30° above and below the x—y plane as marked by arrow 34. The rotation of the assembly 14 is performed by z axis unit 20 and middle bearing unit 22 and produces motion generally in the z direction. The y axis arm 18 translates the head 24 along the y direction, as marked by arrow 32. The head 24 has two axes of rotation as shown in FIG. 1C; an azimuthal axis 35 parallel to the y axis and an elevation axis 37 perpendicular to azimuthal axis 35. The rotations are indicated by arrows 36 and 38, respectively. It will be appreciated that the x axis is the only fixed axis of the system; the locations of the remaining axes are variable and depend generally on the location of the x axis carriage 16.

Each laser system 10 described hereinabove is typically about 3 m long, 2 m wide and 2 m high and typically stands 1.5-2.5 m from the chassis 11. The y axis arm 18 typically maximally extends 1.6 m and the z axis rotation typically produces a range of about 2 m. The entirety of two systems 10 is typically about 7 m; in comparison, a chassis 11 is typically 3.5 m.

Reference is now made to FIG. 2 which indicates the generally straight optical path which the laser beam, denoted 40, follows. It will be understood that a "straight" optical path is one in which there are no rotary elbows. Any changes in direction of the laser beam are performed by single mirrors.

The laser head 12 produces beam 40 and directs it in a typically vertically downward direction. The beam 40 passes through an external conduit 42, impinges upon one of two flat non-rotating mirrors 43, such as copper gold coated mirrors manufactured by SPECAC of the UK, of a beam director 44, and is subsequently redirected, in its entirety, along the x axis of one of the beam assemblies 14. It should be noted that the length of the external conduit 42 is the extent of the external beam delivery. It should also be noted that at any given time, only one system 10 receives the laser beam 40.

The internal beam delivery is performed as follows. The beam 40 leaves the beam director 44 and subsequently impringes upon a flat mirror 46, such as a gold coated copper mirror, located in a fixed location on x axis carriage 16. The length of the x axis beam delivery is variable and depends upon the location of the x axis carriage. Bellows 17 shrink and expand in accordance with the motion of the x axis carriage 16 and typically ensure that the laser beam 40 is completely enclosed.

From its location on the x axis carriage 16, mirror 46 directs the beam 40 along the y axis arm 18 and inside a bellows 48 a flat mirror 50, such as a gold coated copper mirror by Specac, located in the head 24. The length of the y direction delivery is variable and depends on the extension of the y axis arm 16; it is typically shorter than the x axis beam delivery length. Additionally, as can be seen from the description hereinabove, the external beam delivery is typically short with respect to the internal beam delivery.

Figure 3A:
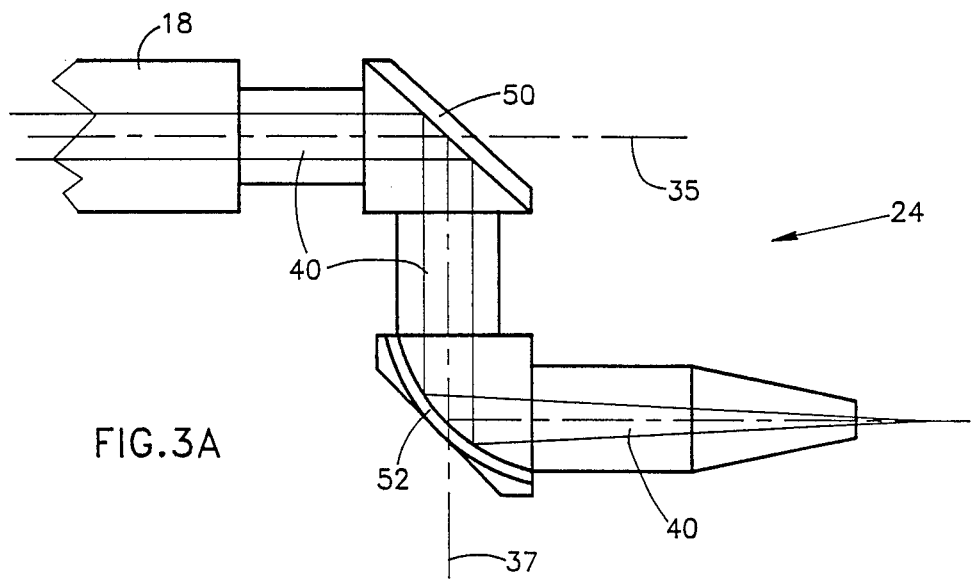
FIG. 3A is a pictorial illustration of the optical path of a welding laser beam in the welding head of the system of FIG. 1A.

Mirror 50 bends the beam 40 towards a concentrating mirror 52, such as a copper covered molybdenum parabolic mirror by Specac, which subsequently concentrates the beam 40 and directs it towards the desired welding location on chassis 11. FIG. 3A shows the welding head 24 and the optical path through it in more detail.

Figure 3B:
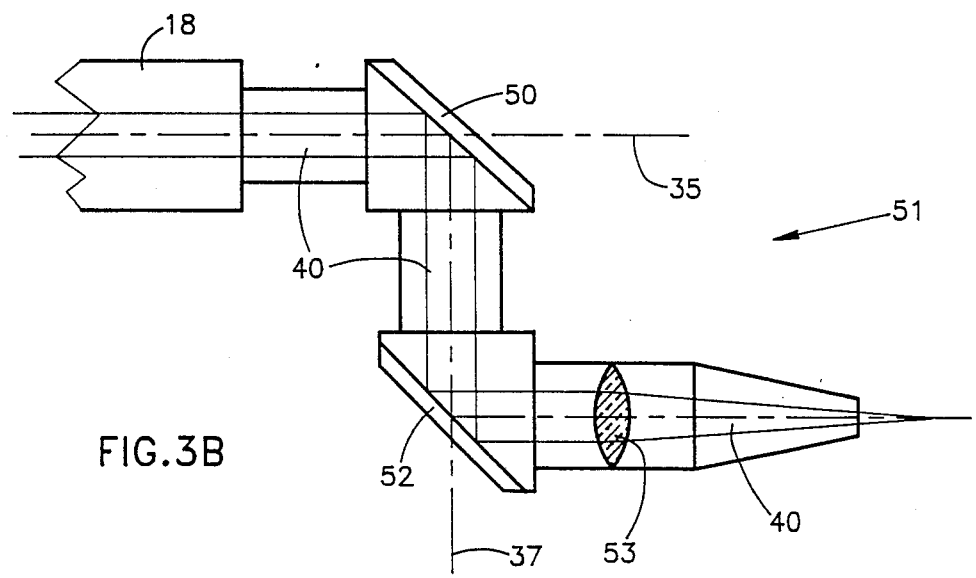
FIG. 3B is a pictorial illustration of the optical path of a cutting laser beam in the cutting head of the system of FIG. 1A.

According to an alternative embodiment of the present invention, the welding head 24 is a cutting head 51, as shown in FIG. 3B. According to this second embodiment, mirror 52 is a flat mirror, such as a gold coated copper mirror by Specac, which directs the beam 40 to a lens 53, such as a ZnSe lens with double anty reflective coating by Specac, which, in turn, directs the beam 40 to the cutting location.

According to both embodiments, mirrors 50 and 52 of welding head 24 constitute a rotary elbow and rotate about axes 35 and 37, respectively; these rotations are the only rotations in an otherwise generally straight optical path, and they occur at the end of the path. It should be noted that the length of the optical path through the welding head 24 to the welding location on chassis 11 is considerably shorter than the length of the optical path up to the welding head 24. Thus, any misalignment between the two mirrors 50 and 52 of the welding head causes minimal divergence of the beam 40 at the welding location.

It should be noted that the welding head 24 can be any suitable welding head and the cutting head 51 can be any suitable cutting head; the conditions of their operation are outlined hereinabove along with a preferred embodiment.

Three features of the present invention are that the x axis is fixed in space, that it is both an axis of translation and an axis of rotation and that the beam 40 is directed along it. Thus, it is additionally a feature of the present invention that mirror 46 operates to direct the beam 40 along three axes, the x, y and z axes. The location of mirror 46 on the x axis, which changes as the x axis carriage 16 translates, defines the length of the x axis beam delivery. From its current x axis location, mirror 46 directs the beam 40 in the y direction. Finally, as assembly 14 rotates about the x axis, mirror 46 also rotates and in this manner, directs the beam 40 in the z direction.

The utilization of mirror 46 for direction of the beam 40 in three axes results in a significant reduction in the number of mirrors over the prior art and a corresponding reduction in the time necessary for calibration of the system. An additional improvement is that translation along the x axis and rotation about it does not affect the accuracy of the x axis beam delivery.

Figure 4:
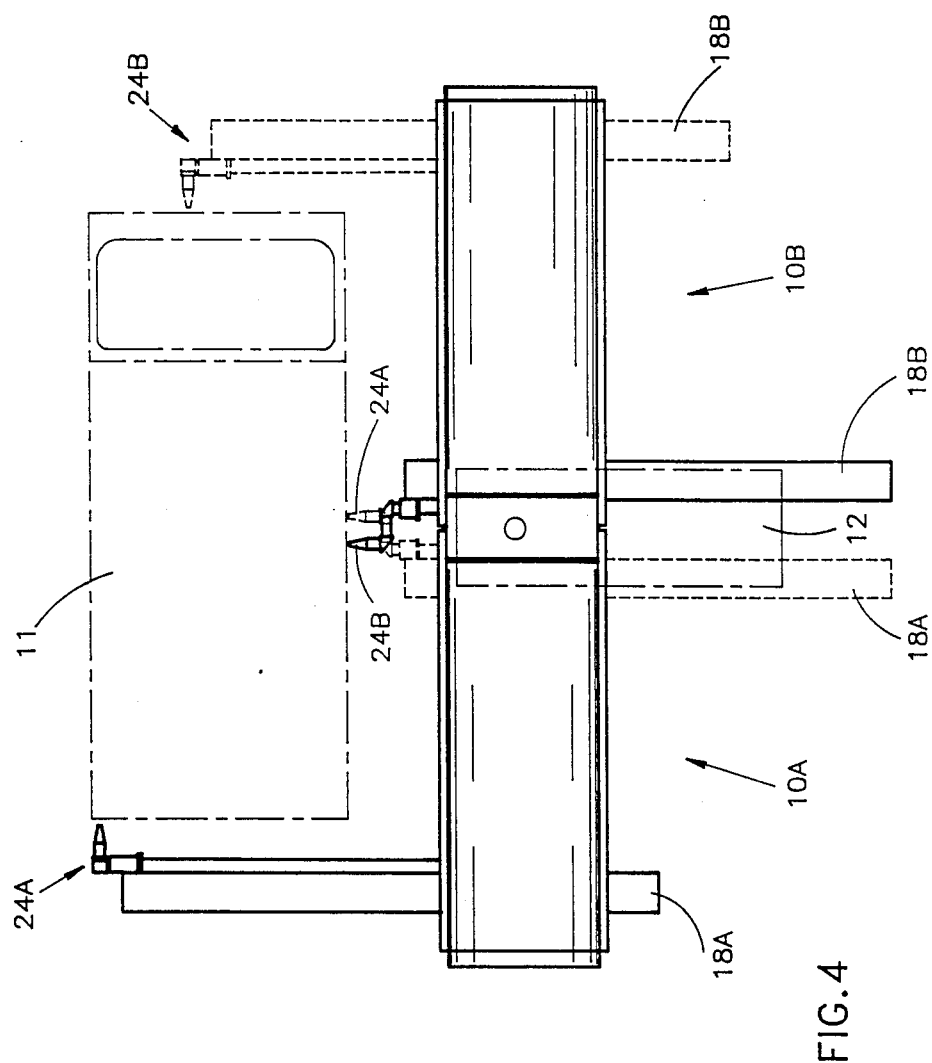
FIG. 4 is a pictorial illustration of the multiplicity of welding locations reachable by the system of FIG. 1A.

The requirement of a generally straight optical path has mechanical advantages, such as a relatively rigid mechanism and ease in approaching a multiplicity of welding locations on the chassis 11, FIG. 4 illustrates four welding locations typically reached by a pair of laser welding systems 10a and 10b where each system 10 has two positions. Position 1 is denoted with solid lines and position 2 is denoted with dashed lines. Welding head 24a of system 10a operates on the left back corner of chassis 11 at generally the same time that head 24b operates on the center of the right side panel. Alternatively, as shown in position 2, head 24a can operate on the center of the right side panel while head 24b operates on the front panel of chassis 11. FIG. 4 additionally shows that there is an overlap region in the center of the chassis 11 within which both systems can operate. It will be appreciated that other combinations of two welding locations, other than those shown in FIG. 4, is possible.

Figure 5:
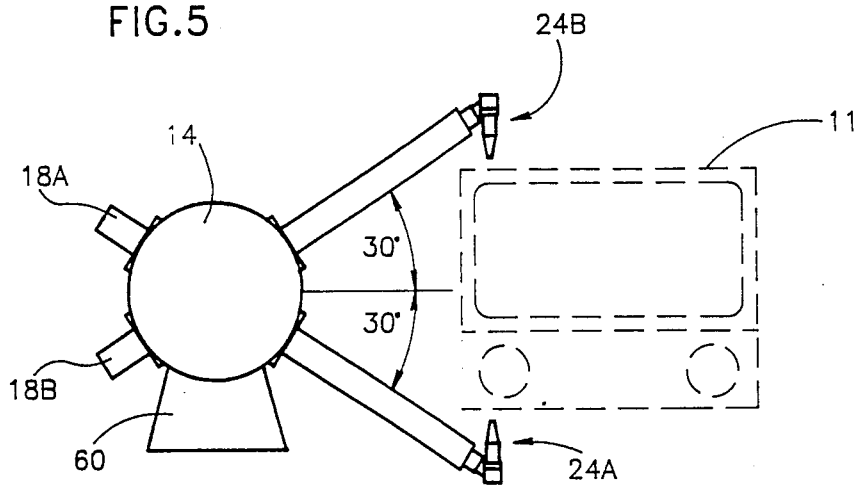
FIG. 5 is a pictorial illustration of the range of the system of FIG. 1A in the vertical axis.

Reference is now made to FIG. 5 which illustrates the range of movement of two systems 10 in the vertical or z direction. Head 24a is shown welding underneath chassis 11 at generally the same time that head 24b is welding on the roof of chassis 11. As can be seen from FIG. 5, head 24b typically does not reach the entirety of locations on the roof of chassis 11. This problem is solved, in an alternative embodiment, by raising the height of base supports 60 and is shown in more detail in FIG. 6A.

FIG. 6A illustrates a pair of welding systems 10 whose base supports 60 have been raised by a height large enough to ensure that the y axis arm 18 can reach over the top of chassis 11. The higher location shown in FIG. 6A is useful for reaching locations on the roof of the chassis 11. As was shown with respect to FIG. 4, the y axis arm 18 reaches to the far side of the chassis 11.

In the alternative embodiment shown in FIG. 6A, the laser system 12 is located below the systems 10 and thus, the laser beam 40 is first delivered in a vertically up direction. In all other respects, the configuration of FIG. 6A operates as described hereinabove. FIG. 6A also illustrates an alternative configuration of the laser system 12, that of parallel to the systems 10 rather than perpendicular to it as has been shown hereinabove.

It will be appreciated that the laser system of the present invention is modular. Two systems 10 can be placed at different heights relative to the chassis 11, as has been described hereinabove, or they can be configured as a unit of four systems 10 consisting of a first two systems at one height and a second two systems above the first two systems, as described hereinbelow with respect to FIG. 6B. Alternatively, a welding station of eight systems, four on each side, is possible. Further, as described hereinbelow with respect to FIG. 6C, one system 10, generally the length of chassis 11, can be used in place of two systems 10 as has been shown hereinabove.

Figure 6B:
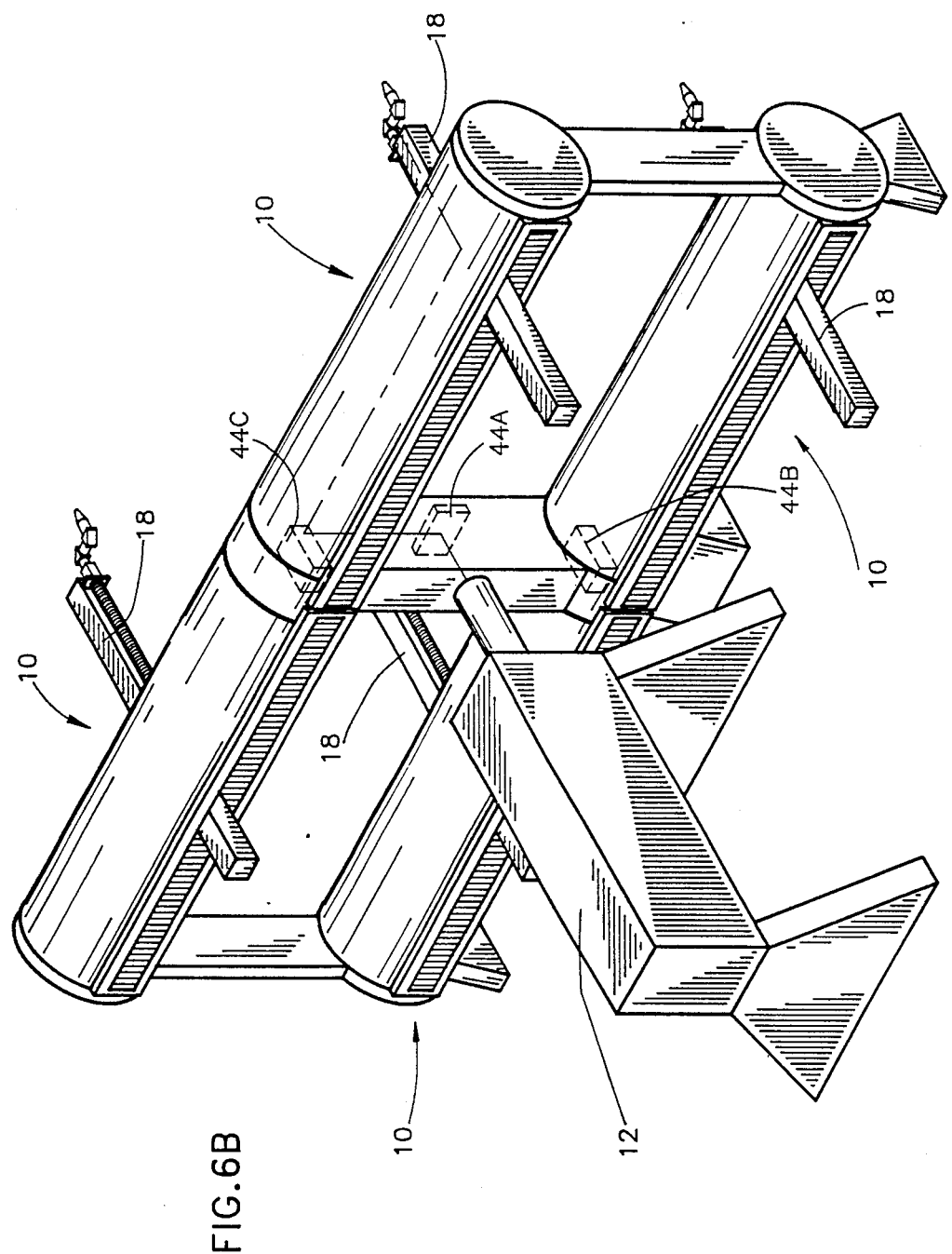

FIG. 6B illustrates the configuration of four welding systems. This alternative embodiment enables four locations of the chassis 11 to be welded at generally the same time. The laser beam 40 is delivered from laser system 12 to a beam director 44a which directs the beam 40 either vertically downward to the beam director 44b of the lower two systems 10 or vertically upward to the beam director 44c of the upper two systems 10. The beam director 44b or 44c which receives the beam 40 then redirects it to the system 10 which is to perform the welding at the current time. It will be appreciated that the beam director 44a will face sideways, that beam director 44b will face upward and that the beam director 44c will face downward, as will be described in more detail hereinbelow.

Figure 6C:
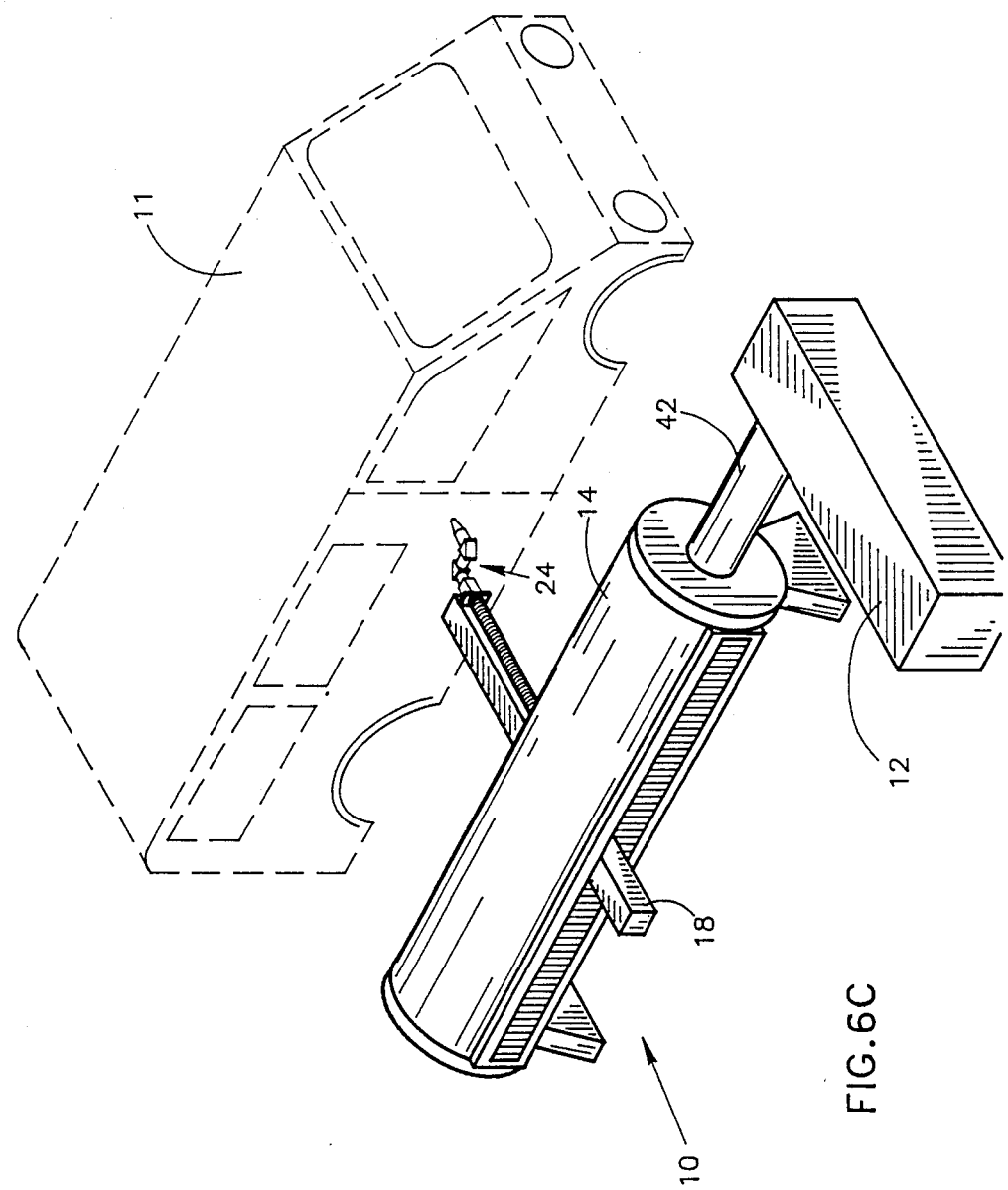

FIG. 6C illustrates an embodiment of one system 10 generally the length of chassis 11. In this embodiment, the laser system 12 delivers the beam horizontally along the fixed x axis of the system eliminating the need for a beam director 44. Accordingly, this embodiment has only three mirrors, 46, 50 and 52.

Figure 7A:
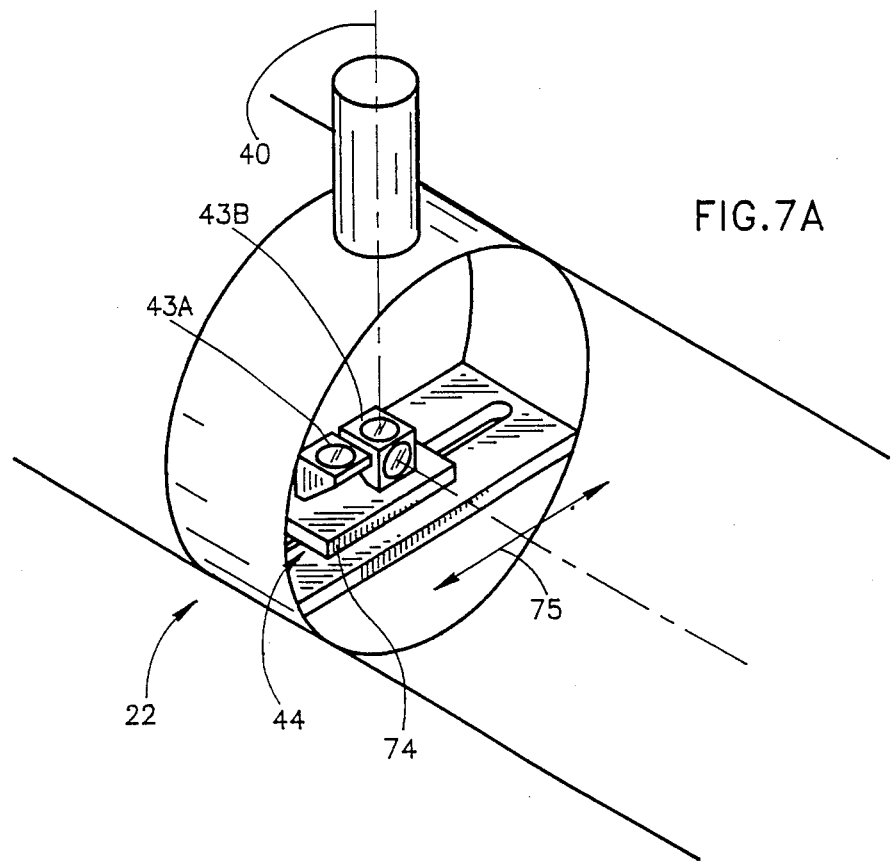
FIG. 7A is an illustration of a beam director useful in the system of FIG. 1A.

Reference is now made to FIG. 7A which illustrates the mechanism of an upwardly facing beam director 44. Beam director 44 is typically located on the lower face of middle bearing unit 22 and comprises two directing mirrors 43a and 43b for directing the laser beam 40 to the laser welding system 10 on the left of the beam director and to the system 10 on the right of the beam director, respectively. The mirrors 43 are typically attached to a precision pneumatic table 74, such as the HO 2075 manufactured by THK of Japan, which operates to precisely locate one of mirrors 43 to receive beam 40 and to redirect it along the x axis of the appropriate one of a pair of systems 10. Pneumatic table 74 typically translates along the y axis of the system as shown by arrow 75.

Figure 7B:
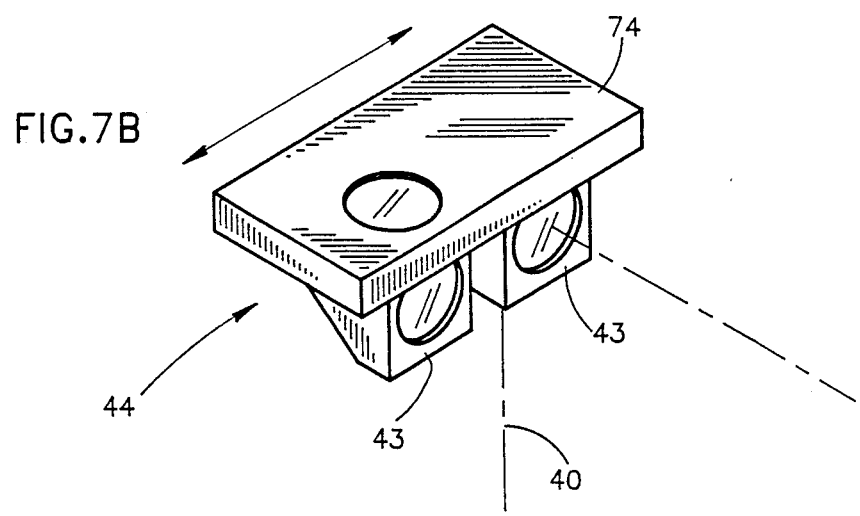
FIG. 7B is an illustration of a beam director useful in the system of FIG. 6B.

Each mirror is set at a precise 45° angle to the entrance axis of the beam 40; as shown in FIG. 7, mirror 43a faces to the left and mirror 43b faces to the right.

In an alternate embodiment of the beam director, as described with respect to FIG. 6B, a downwardly facing beam director 44 is located on an upper face of the middle bearing unit 22. In a third embodiment of the beam director, shown in FIG. 7B and as described with respect to FIG. 6B, the beam director 44a is located on the side wall of the middle bearing unit 22. The mirrors 43 direct the beam 40 vertically upward or vertically downward and the pneumatic table 74 translates along the x axis. In the other two embodiments, the downwardly and upwardly facing beam directors, the pneumatic table 74 translates in the y direction. The other details of the beam director 44 remain the same for both of the abovementioned embodiments.

Figure 8:
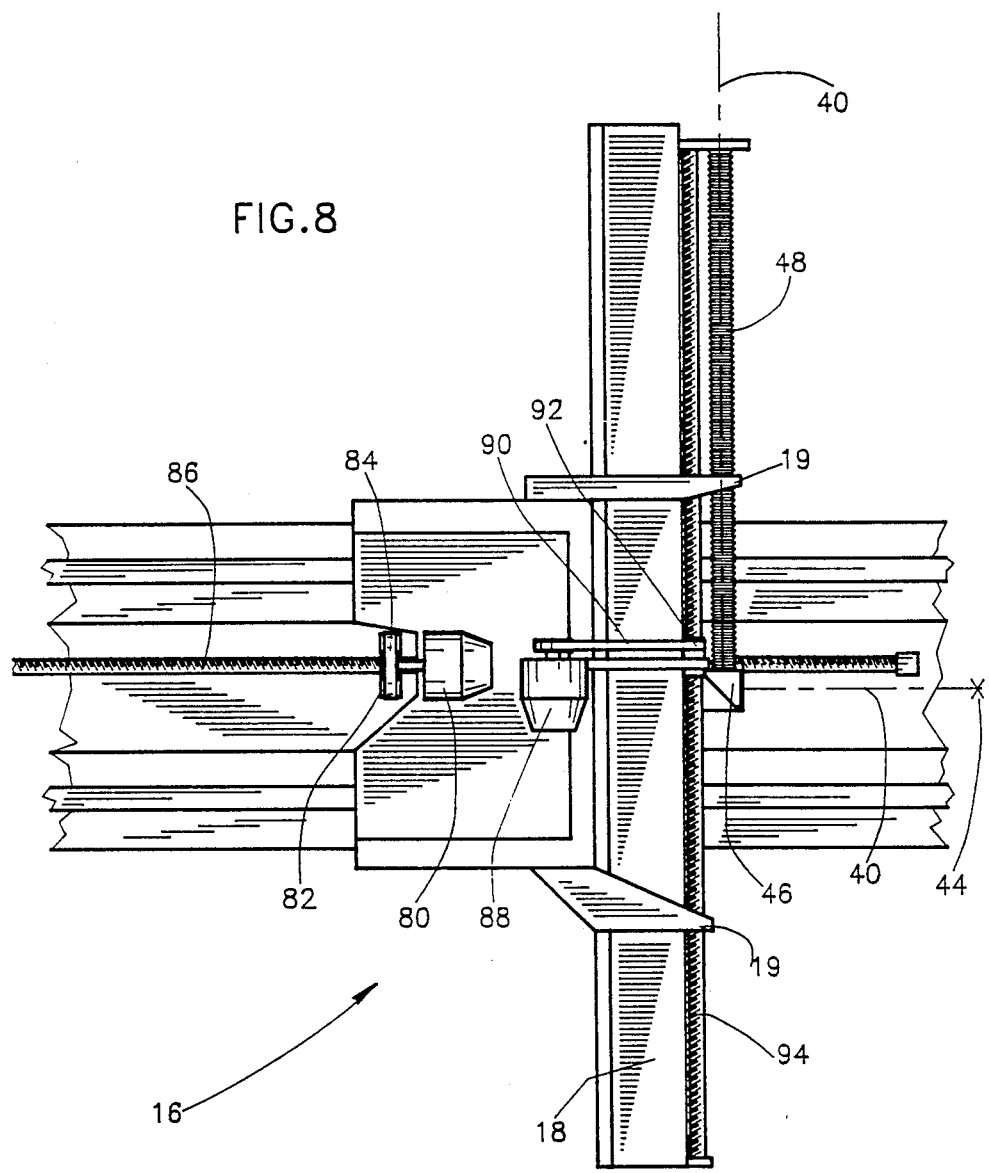
FIG. 8 is an illustration of an x axis carriage useful in the system of FIG. 1A.

Reference is now made to FIG. 8 which illustrates the generally rigid translational mechanism in the x axis and y direction and its coordination with the generally straight optical path. The mechanism comprises a DC servo motor 80, such as the JR16M4CHF12T manufactured by PMI of the U.S., located on the x axis carriage 16, which rotates a nut 82 via a timing belt 84 and causes the x axis carriage 16 to translate along a fixed leading ball screw 86, such as the 1512-4-9004 manufactured by Star of W. Germany. The y axis arm 18 is typically translated through the y axis frame 19 in a similar manner, typically by a servo motor 88, such as the JR24M4CHF12T by PMI, a timing belt 90, a nut 92 and a fixed ball screw 94 similar to ball screw 86. It will be appreciated that the use of fixed ball screws 86 and 94 ensures a generally rigid and accurate movement and additionally provides a generally smooth motion.

FIG. 8 also indicates the coordination of the optical path with the translating mechanism. As mentioned hereinabove, it is a feature of the invention that beam 40 is directed by one of the mirrors 43 of beam director 44 along the fixed x axis of the system 10. Thus, in order to ensure that nothing interferes with the optical path, the fixed leading ball screw 86 is located along an axis parallel, but not equivalent to the fixed x axis.

Mirror 46 is typically located on the x axis carriage 16 on the side closest to the beam director 44 and in front of the y axis arm 18 and the screw 94. The optical path in the y direction, covered by bellows 48, is thus separate from the translation mechanism. In the system of FIG. 6C, mirror 46 is located on the x axis carriage 16 on the side closest to the location of the laser head 12.

As mentioned hereinabove, the fixed x axis, as defined by the path of the light beam 40, is the axis of rotation of the beam locating assembly 14. The mechanism which performs the rotation of the assembly 14 about the fixed x axis utilizes a linear screw at a predetermined distance from the center of rotation thereby to ensure a relatively smooth and accurate motion, as shown in FIGS. 9A–9D and as is described in detail hereinbelow.

Figure 9A:
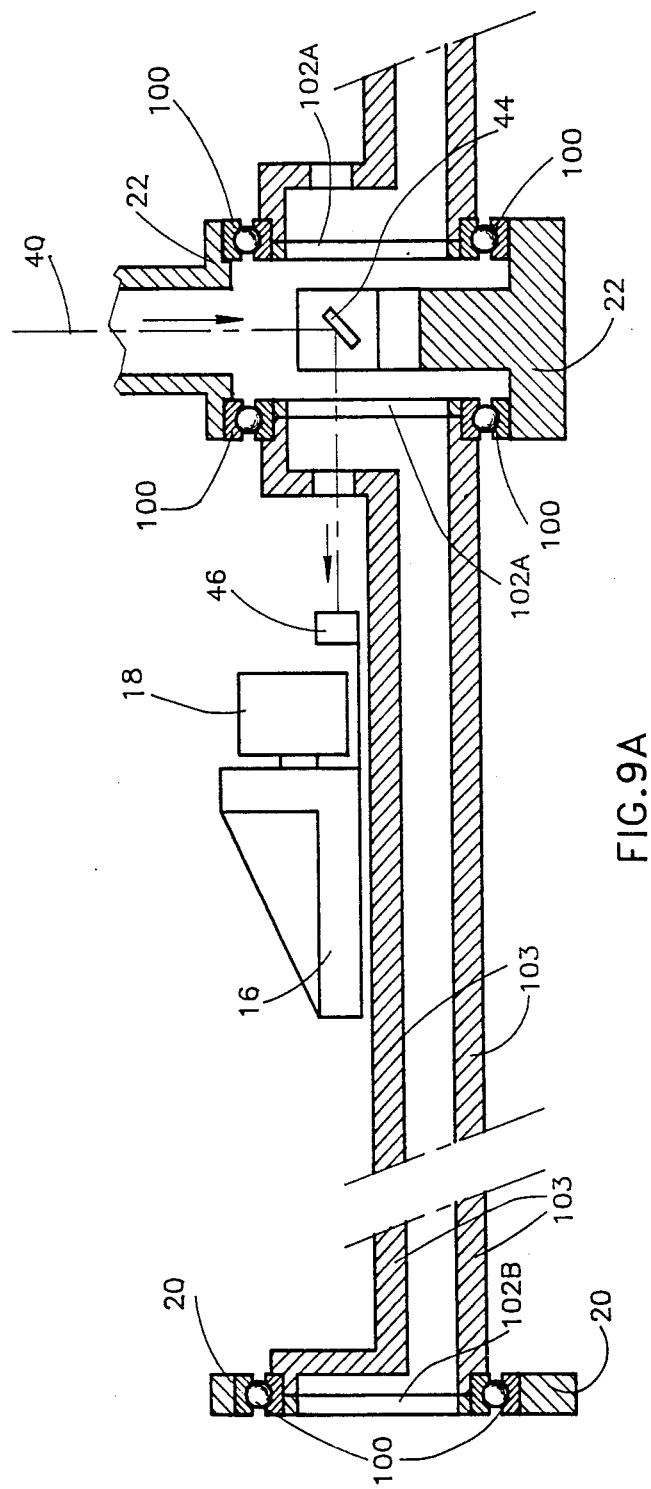
FIGS. 9A-9D are illustrations of a z axis rotation assembly useful in the system of FIG. 1A.
Figure 9B:
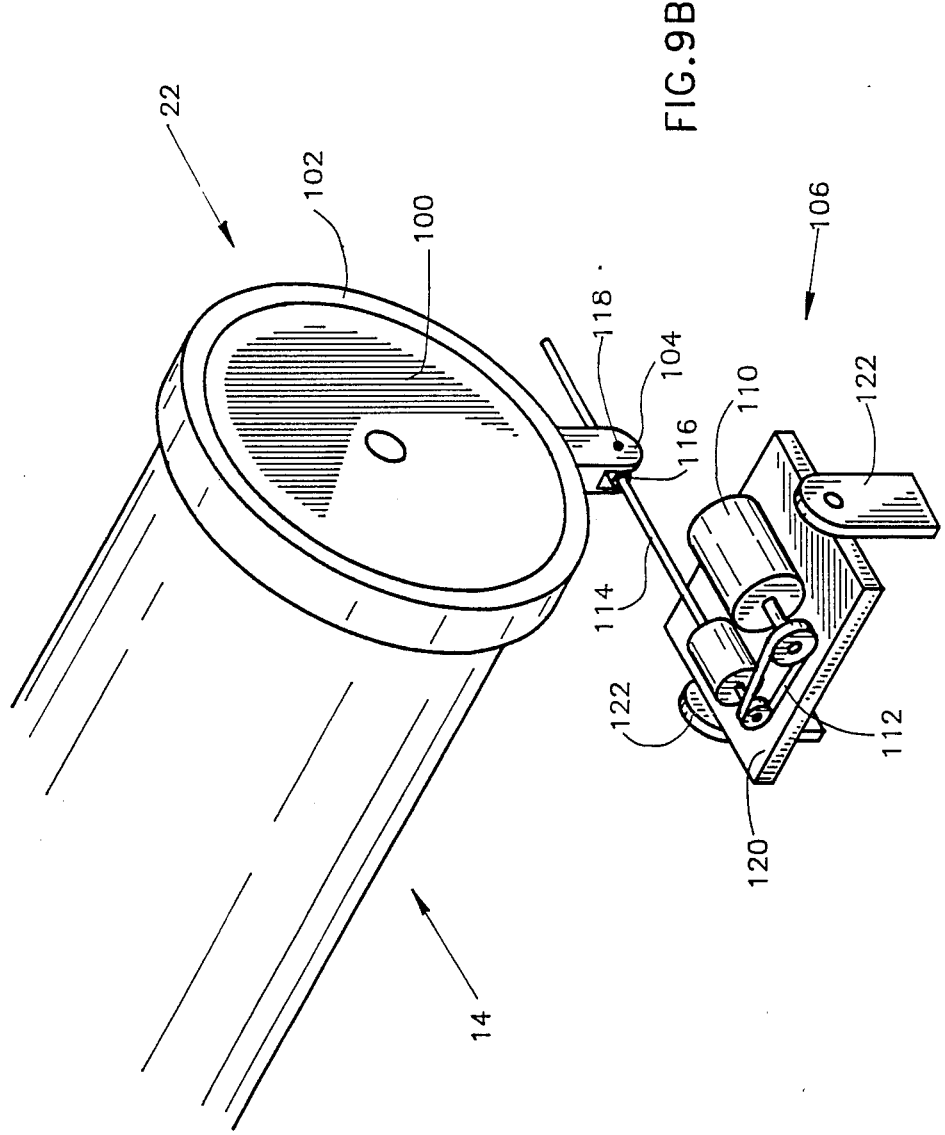

With reference to FIGS. 9A and 9B, beam locating assembly 14 is comprised of two large rings 102a and 102b and a frame 103 which is typically integrally connected to them and to which is attached the entirety of the mechanism of the x axis carriage 16. The large rings 102a and 102b are located in the middle bearing unit 22 and in the z axis unit 20, respectively, and rotate on two thin section, wide diameter bearings 100, such as the RB60040UU by THK. An extension 104 is typically attached to frame 103 near large ring 102a. A rotating assembly 106 (FIG. 9B), generally connected to the base support 60 of middle bearing unit 22 but standing outside of it, rotates extension 104 causing frame 103 to rotate on bearings 100 and producing the z axis motion of assembly 14.

Rotating assembly 106 comprises a DC servo motor 110 (FIG. 9B), such as the JR24M4CHF12T by PMI, which rotates a timing belt 112, which subsequently rotates a ball screw 114, such as the 1512-5-4004 by Star, through a bearing 115. Ball screw 114 rotates inside a nut 116 which is attached, via pin 118, to extension 104. As ball screw 114 rotates, extension 104, and thus, assembly 14, rotates. To accommodate the resultant change in angle between the extension 104 and the ball screw 114, the nut 116 is attached to pin 118 and thus, can oscillate. Additionally, the motor 110 and the ball screw 114 are attached to a flange 120 which oscillates on a axle 122 typically connected to base 60 of bearing unit 22.

Figure 9C:
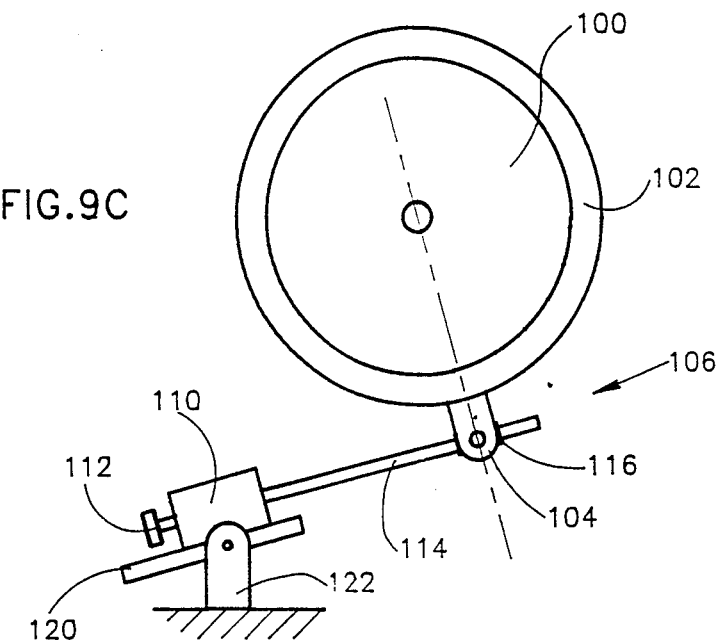
Figure 9D:
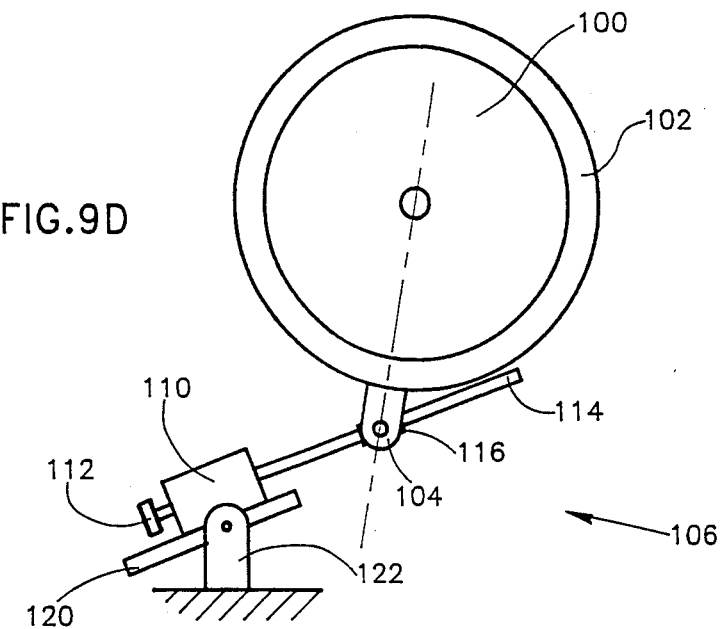

FIG. 9B shows the rotating assembly 106 with the extension 104 in a central position, and FIGS. 9C and 9D show the rotating assembly with the extension 104 at two opposite and generally extreme positions. It will be appreciated that the combination of a ball screw produced linear motion about very large bearings produces a generally rigid z direction motion.

Figure 10:
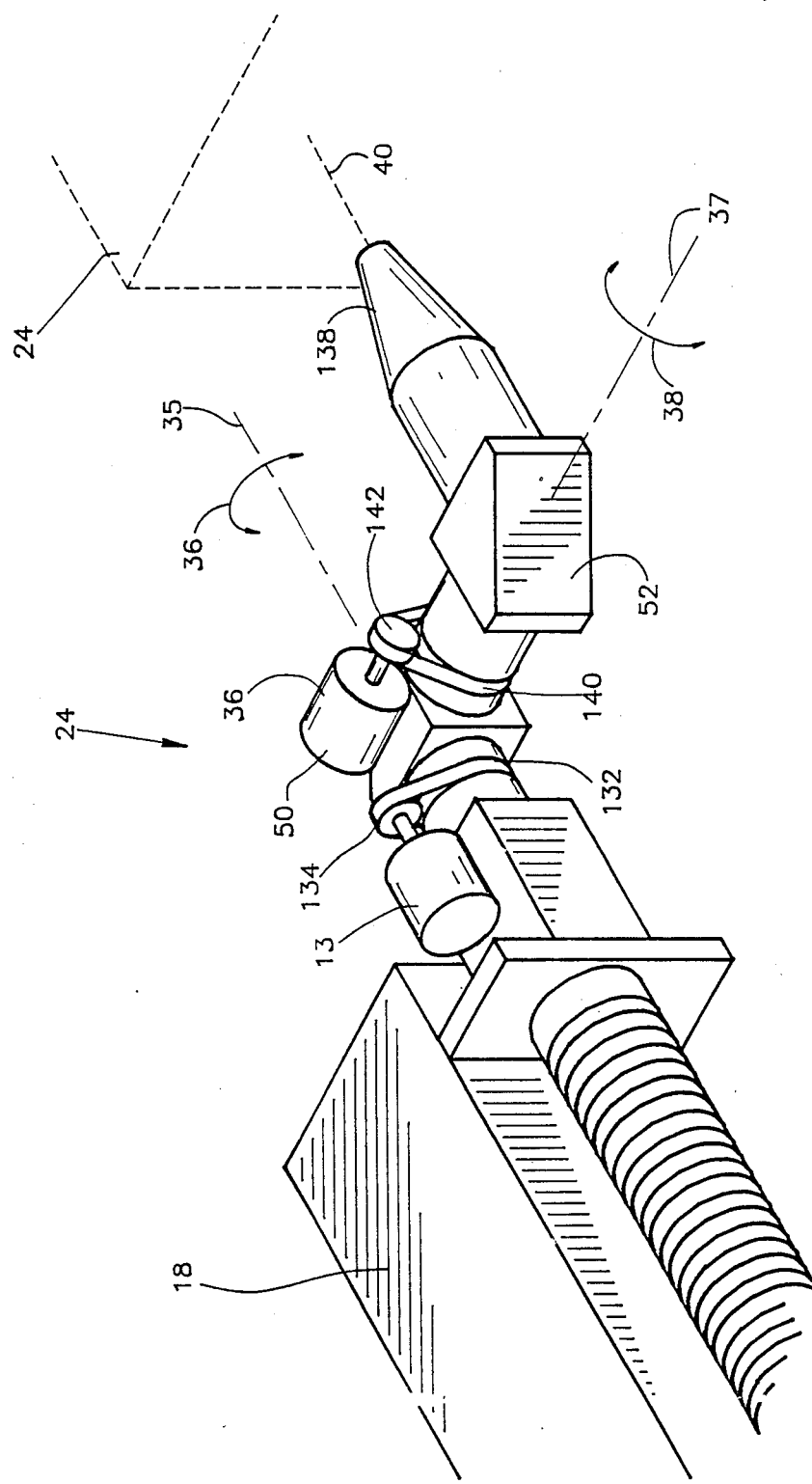
FIG. 10 is an illustration of a mechanism to rotate a welding head, useful in the system of FIG. 1A.

Reference is now made to FIG. 10 which illustrates a mechanism for rotating the elements of welding head 24. A DC servo motor 130, such as the HDSA-20 by Harmonic Drive of Japan, attached to y axis arm 18, rotates the welding head 24 about axis 35 via a timing belt 132 and a gear 134. This movement causes mirror 50 to rotate.

A DC servo motor 136, similar to motor 130 and attached to welding head 24, rotates mirror 52 and a nozzle 138, via a timing belt 140 and a gear 142. It will be appreciated that the two axes of rotation provided by the welding head 24 ensures that the nozzle 138 typically directs the beam 40 at the chassis 11 at an angle generally perpendicular to the welding location of chassis 11.

It will be appreciated by persons skilled in the art that the present invention is not limited by what has been particularly shown and described hereinabove. The scope of the present invention is defined only by the claims which follow:

I claim:

1. A laser system comprising:
   laser means providing a laser beam along a fixed generally horizontal first axis;
   means for redirecting said laser beam to impinge on a workpiece at a desired location thereon and including;
     means disposed for rotation about and translation along said fixed generally horizontal first axis for redirecting said laser beam along a second axis;
     laser head means arranged to receive said laser beam along said second axis and to cause it to impinge on said workpiece at said desired location; and
   means for translating said laser head means along said second axis wherein said translation along said second axis is independent of translation along said first axis.

2. A laser system according to claim 1 and wherein said means disposed for rotation and translation comprises a single flat mirror.

3. A laser system comprising:
   laser means providing a laser beam along a fixed generally horizontal first axis;
   means for redirecting said laser beam to impinge on a workpiece at a desired location thereon and including;
     means disposed for rotation and translation about said fixed generally horizontal first axis for redirecting said laser beam along a second axis; and
     laser head means arranged to receive said laser beam along said second axis and to cause it to impinge on said workpiece at said desired location,
   and wherein said laser means comprise means for receiving said laser beam along a third axis and for redirecting it along said fixed first axis.

4. A laser system according to claim 3 and wherein said means for receiving said laser beam comprises a beam director which directs said laser beam in a selectable one of two directions.

5. A laser system according to claim 1 and wherein said laser head means comprises a cutting head including two flat mirrors and a concentrating lens.

6. A laser system according to claim 1 and wherein said laser head means comprises a welding head including a flat mirror and a concentrating mirror.

7. A laser system according to claim 5 and wherein said laser head means includes two mirror elements which rotate about two generally orthogonal axes.

8. A laser system according to claim 6 and wherein said laser head means includes two mirror elements which rotate about two generally orthogonal axes.

9. A laser system according to claim 1 and wherein the optical path length along said fixed first axis can greatly exceed the length of the optical path from said fixed first axis to said desired location.

10. A laser system according to claim 1 and wherein said optical path length from said laser means to said laser head means is considerably longer than the optical path length from said laser head means to said desired location.

11. A laser system according to claim 1 and wherein said means disposed for rotation and translation comprise an x axis carriage, a y axis arm and a z axis rotation unit.

12. A laser system according to claim 11 and wherein said x axis carriage translates on a fixed linear screw thereby to produce a smooth and rigid motion.

13. A laser system comprising:
    laser means providing a laser beam along a fixed generally horizontal first axis;
    means for redirecting said laser beam to impinge on a workpiece at a desired location thereon an including;
      means disposed for rotation and translation about said fixed generally horizontal first axis for redirecting said laser beam along a second axis; and
      laser head means arranged to receive said laser beam along said second axis and to cause it to impinge on said workpiece at said desired location,
    wherein said means disposed for rotation and translation comprise an x axis carriage, a y axis arm and a z axis rotation unit and wherein said y axis arm translates on a fixed linear screw thereby to produce a smooth and rigid motion.

14. A laser system comprising:
    laser means providing a laser beam along a fixed generally horizontal first axis;
    means for redirecting said laser beam to impinge on a workpiece at a desired location thereon and including;
      means disposed for rotation and translation about said fixed generally horizontal first axis for redirecting said laser beam along a second axis; and
      laser head means arranged to receive said laser beam along said second axis and to cause it to impinge on said workpiece at said desired location,
    wherein said means disposed for rotation and translation comprise an x axis carriage, a y axis arm and a z axis rotation unit and wherein said z axis rotation unit comprises a linear screw displaced from a center of the z axis rotation thereby to produce a smooth and rigid rotation.

15. A laser system comprising:
    laser means providing a laser beam along a fixed generally horizontal first axis;
    means for redirecting said laser beam to impinge on a workpiece at a desired location thereon and including;
      means disposed for rotation and translation about said fixed generally horizontal first axis for redirecting said laser beam along a second axis;
      laser head means arranged to receive said laser beam along said second axis and to cause it to impinge on said workpiece at said desired location; and
      first and second separate means for redirecting, and wherein said laser means comprise a single laser.

16. A laser system comprising:

laser means providing a laser beam along a fixed generally horizontal first axis;

means for redirecting said laser beam to impinge on a workpiece at a desired location thereon and including;

means disposed for rotation and translation about said fixed generally horizontal first axis for redirecting said laser beam along a second axis;

laser head means arranged to receive said laser beam along said second axis and to cause it to impinge on said workpiece at said desired location; and first, second, third and fourth separate means for redirecting, wherein said first and second separate means for redirecting are located above said third and fourth means for redirecting, and wherein said laser means comprise a single laser.

17. A laser system according to claim 15 and wherein each separate means for redirecting comprises three mirrors and wherein said laser means comprises a single beam director.

18. A laser system according to claim 16 and wherein each separate means for redirection comprises three mirrors and wherein said laser means comprises three beam directors.

* * * * *